United States Patent [19]

Ukeiley

[11] B 3,982,080
[45] Sept. 21, 1976

[54] AUTOMATIC CABLE BALANCING NETWORK

[75] Inventor: Richard Larry Ukeiley, Englishtown, N.J.

[73] Assignee: Bell Telephone Laboratories, Incorporated, Murray Hill, N.J.

[22] Filed: Jan. 16, 1975

[21] Appl. No.: 541,415

[44] Published under the second Trial Voluntary Protest Program on February 3, 1976 as document No. B 541,415.

[52] U.S. Cl. .......................................... 179/170 D
[51] Int. Cl.² ........................................ H04B 1/52
[58] Field of Search ............... 179/170 R, 170 D; 333/18, 28 R

[56] References Cited
UNITED STATES PATENTS

| | | | |
|---|---|---|---|
| 2,302,374 | 11/1942 | Mitchell | 179/170 D |
| 2,303,419 | 12/1942 | Affel | 179/170 D |
| 3,178,521 | 4/1965 | Brown | 179/170 D |
| 3,824,501 | 7/1974 | Harris | 333/18 |
| 3,875,350 | 4/1975 | Fischer | 179/170 D |

*Primary Examiner*—Kathleen H. Claffy
*Assistant Examiner*—Randall P. Myers
*Attorney, Agent, or Firm*—H. L. Logan

[57] ABSTRACT

Disclosed is apparatus for automatically balancing the hybrid network in a telephone system having a bidirectional cable connected to a first preselected hybrid network port and a balancing network connected to a second preselected hybrid network port. In response to a test signal applied to a third port of the hybrid network, the disclosed apparatus develops control signals in response to the magnitude and phase of signals at the hybrid network's first and second ports. These signals adjust the impedance of the balancing network to effect hybrid network balance.

10 Claims, 4 Drawing Figures

AUTOMATIC CABLE BALANCING NETWORK

BACKGROUND OF THE INVENTION

1. Field of the Invention

This invention relates to wave transmission and, more particularly, to circuit arrangements for automatically balancing hybrid networks.

2. Description of the Prior Art

In many signal transmission applications where bidirectional communication is carried over cable, signals traversing the two directions need to be periodically separated so that they may be amplified. Signal separation is generally accomplished in a four port biconjugate network, known as a hybrid (and hereinafter so called), by connecting the bidirectional cable to one preselected port of the hybrid and by connecting a proper balancing network to another preselected port of the hybrid. The separated signals appear at the remaining two ports of the hybrid, whereto the unidirectional lines are connected.

In order to achieve hybrid balance, and, thus, proper signal separation, it is known that the impedance of the balancing network must closely match the impedance of the bidirectional cable. An impedance mismatch between the bidirectional cable and the balancing network can result in signal reflections which, in turn, can result in unacceptable return-loss performance, in instability of amplifiers in the telephone circuits, or in echoes which are subjectively objectionable to the telephone user.

Because present day telephone transmission facilities exhibit a wide range of impedances, it has often been necessary to either construct precision balancing networks which would manually be adjusted to match the line impedance of a number of installations, or to manufacture a large number of different balancing networks. In both cases, prior art balancing networks have often been complex and rather large in size.

SUMMARY OF THE INVENTION

An objective of this invention is to control a balancing network associated with a hybrid network so as to automatically balance the hybrid network to any cable within a wide range of available telephone cables.

A further objective of this invention is to automatically impedance-match a hybrid network to a transmission cable by adjusting the hybrid network's balancing network in response to the hybrid's signal conditions.

These and other objectives are achieved with hybrid balancing networks that are specifically designed to allow for automatic balancing of the hybrid over a desired range of impedances.

A typical hybrid network system has a bidirectional cable connected to a first signal port of the hybrid and a balancing network connected to a second signal port of the hybrid. In accordance with this invention, automatic network balancing is achieved by measuring signal magnitude and phase at the first and second ports in response to a test signal applied to a third port of the hybrid, and by developing two control signals to affect the impedance parameters of the balancing network. One, a gain control signal, represents the difference in magnitude between the two measured signals; and the other, a frequency control signal, represents the difference in phase between the two measured signals. More specifically, for nonloaded cable facility applications, the balancing impedance network is advantageously implemented with a circuit exhibiting an impedance function characterized by an adjustable scaler multiplier, an adjustable real pole in the frequency domain, a fixed real pole in the frequency domain, and two fixed real zeros in the frequency domain. In accordance with the invention, the developed gain control signal adjusts the scaler multiplier, and the frequency control signal controls the adjustable pole.

For loaded telephone cable facility applications, the balancing impedance network is advantageously implemented with a circuit exhibiting an impedance function characterized by an adjustable scaler multiplier, an adjustable real zero in the frequency domain, a pair of fixed complex conjugate zeros in the frequency domain, a pair of fixed conjugate poles in the frequency domain, and a fixed real pole in the frequency domain. In accordance with this invention, the developed gain control signal adjusts the scaler multiplier, and the frequency control signal controls the adjustable zero.

When proper hybrid balance is achieved, the gain control and the frequency control signals are stored in a sample-and-hold circuit, the test signal is disconnected, and the system is ready for operation.

DETAILED DESCRIPTION

Figure 1:
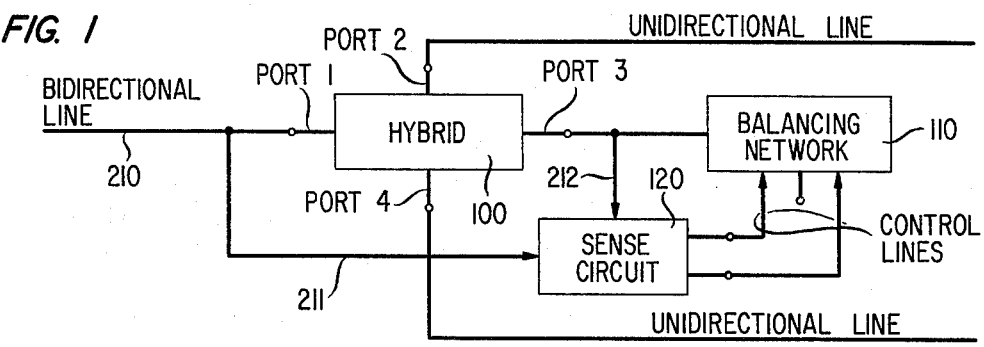
FIG. 1 illustrates the general block diagram of an automatic hybrid network system embodying this invention.

FIG. 1 illustrates the general block diagram of an automatic hybrid network system embodying this invention. In FIG. 1, port 1 of a telephone hybrid network 100 is connected to a bidirectional transmission line 210, port 3 of hybrid 100 is connected to a hybrid balancing network 110, and ports 2 and 4 of hybrid 100 are connected to two unidirectional transmission lines. Additionally in FIG. 1, a sense circuit 120 is connected to ports 1 and 3 of hybrid 100 via lines 211 and 212, respectively. Sense circuit 120 develops two control signals, and applies the control signals to balancing network 110 to affect the impedance parameter values of the balancing network. Hybrid balancing network 110 presents a particular impedance to port 3 of hybrid network 100. When this impedance equals the characteristic impedance of the bidirectional cable, a signal applied to either of the unidirectional lines (ports 2 or 4 of hybrid 100) develops signals at ports 1 and 3 of hybrid 100 that are of equal magnitude and phase.

In accordance with the principles of this invention, hybrid balance is achieved by applying a test signal at one of the unidirectional lines, by measuring the magnitude and phase of the signals at ports 1 and 3 and by modifying the impedance parameters of network 110 to bring the measured signals to equality. Indeed, it has been ascertained that the particular choice of magnitude and phase measurements offers effective, convergent, and stable means for achieving impedance match via control of the impedance parameters of balancing network 110.

When proper hybrid balance is achieved, the gain control and the frequency control signals are stored in a sample-and-hold circuit so that proper control signals continue to be applied to balancing network 110, the test signal is disconnected, and normal communication proceeds.

1. Example of Impedance Synthesis

Figure 2:
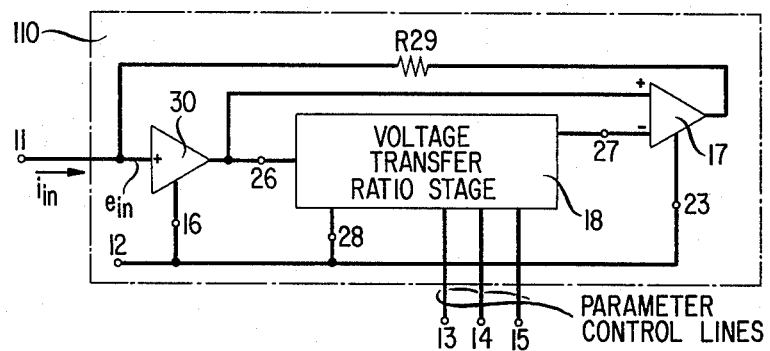
FIG. 2 depicts a basic impedance synthesis circuit useful in the implementation of balancing network 110 of the circuit of FIG. 1.

In accordance with the requirements of this invention, balancing network 110 must present a particular, controllable, impedance to port 3 of hybrid 100. This impedance, which is complex, can generally be approximated by an expression having a finite number of poles and zeros in the frequency domain, and can be synthesized by a variety of techniques. FIG. 2 depicts a basic current employing one synthesis technique for realizing an arbitrary stable impedance. In FIG. 2, the input terminal of an operational amplifier 30, which serves as a buffer amplifier, is connected to a circuit input terminal 11. The output terminal of amplifier 30 is connected to a first input terminal of an operational amplifier 17 and is also connected to an input terminal 26 of a voltage transfer ratio stage 18. An output terminal 27 of voltage transfer ratio stage 18 is connected to a second input terminal of operational amplifier 17, and the output terminal of operational amplifier 17 is connected to the input terminal of buffer amplifier 30 via a feedback resistor $R_{29}$. Common terminals 16, 28, and 23 of buffer amplifier 30, voltage transfer ratio stage 18, and operational amplifier 17, respectively, each connect to a common terminal 12 of the hybrid balancing network 110. Voltage transfer ratio stage 18 is also connected to three parameter control terminals 13, 14, and 15. The function of the parameter control terminals, and their detailed interconnection within stage 18 and within the circuit of FIG. 1, are hereinafter described.

Amplifier 30 can be of either the inverting or the noninverting variety. If amplifier 30 is a noninverting buffer stage, transfer voltage ratio stage 18 is connected between the output terminal of amplifier 30 and the inverting terminal of amplifier 17. Conversely, if amplifier 30 is an inverting stage, voltage transfer ratio stage 18 is connected between the output terminal of amplifier 30 and the noninverting input terminal of amplifier 17.

Regardless of the type of buffer amplifier 30 employed, it can be shown that, when a voltage $e_{in}$ is applied at the input terminal of buffer amplifier 30, the output voltage of operational amplifier 17 is $(1 - T(s))e_{in}$, where $T(s)$ is the voltage transfer ratio of stage 18. Assuming that the input impedance of amplifier 30 is very large as compared to the resistance value of $R_{29}$, (an assumption which is generally valid when operational amplifiers are involved) it can be shown that the input current $i_{in}$ flows essentially only through resistor $R_{29}$ and can be expressed as $$i_{in} = e_{in} T(s)/R_{29}. \qquad (1)$$

From the above, it can be seen that the circuit input impedance between input terminal 11 and common terminal 12 is $$Z(s) = e_{in}/i_{in} = R_{29}/T(s). \qquad (2)$$

A wide variety of circuit techniques exist for synthesizing passive and active circuit configurations having precise pole-zero transfer functions in the left half plane of the frequency domain. Consequently stage 18 may be synthesized to produce virtually any stable $T(s)$ with the result that the circuit arrangement of FIG. 2 permits the precise realization of virtually any stable impedance function. Thus, in essence, the circuit configuration of FIG. 2 reduces the difficult task of realizing driving point impedances to the more easily handled task of synthesizing a circuit (stage 18) having a predetermined voltage transfer ratio whose zero and pole locations correspond to the pole and zero locations, respectively, of the desired driving point impedance.

2. Hybrid Network Balancing for Nonloaded Cables

Utilizing the circuit configuration of FIG. 2 as a hybrid balancing network in a nonloaded bidirectional cable facility, it has been found that substantially all present day telephone cables (including installations of various lengths of 19, 22, 24 and 26 gauge cable installations with mixed gauge cables, installations with both normal telephone and PBX trunk terminations, and installations which include a substantial length of a bridge tap located at any point along the cable length) can be adequately simulated by an impedance function having a finite plurality of poles and zeros in the frequency domain. Moreover, it has been found that normal telephone return-loss and echo objectives can be met for all of the above-mentioned nonloaded cable configurations by a balancing network having a biquadratic impedance function expressed by:

$$A(s) = K_a(sZ_1+1)(sZ_2+1)/(sp_1+1)(sP_2+1) \qquad (3)$$

where $K_a$ is an adjustable (DC) scaler multiplier, $1/Z_1$ and $1/Z_2$ are fixed real zeros, $1/P_2$ is a fixed real pole, and $1/P_1$ is a controllable or an adjustable real pole. Pursuant to equation (2) derived for the circuit of FIG. 2, the impedance function expressed by equation (3) can be synthesized with the circuit of FIG. 2 by establishing the transfer function of stage 18 to be:

$$T(s) = R_{29}(sP_1+1)(sP_2+1)/K_a(sZ_1+1)(sZ_2+1). \qquad (4)$$

Figure 3:
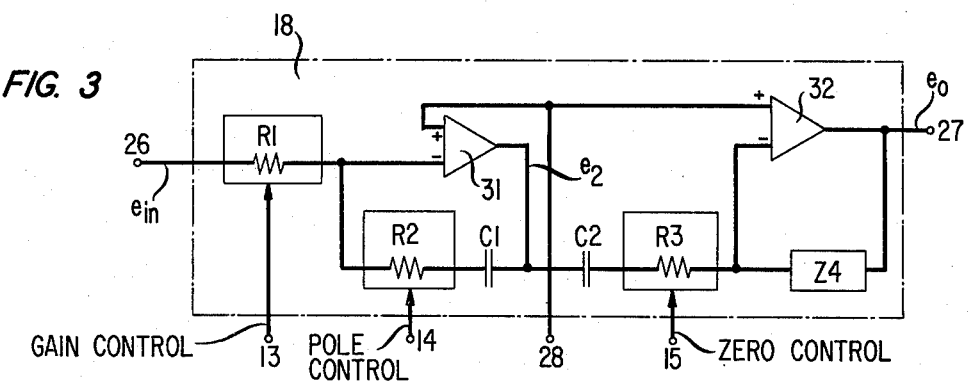
FIG. 3 depicts one embodiment of voltage transfer ratio stage 18 of the hybrid balancing network 110 of FIG. 1.

This transfer function may, for example, be synthesized by the active filter circuit of FIG. 3.

3. Example of a Circuit for Stage 18

FIG. 3 depicts an active filter which may usefully be employed as the voltage transfer stage 18 of FIG. 2. In FIG. 3 resistor $R_1$ is connected between input terminal 26 of stage 18 and the inverting input terminal of operational amplifier 31. The noninverting input terminal of an amplifier 31 is connected to common terminal 28 and to the noninverting input of an operational amplifier 32. Signal $e_2$, at the output terminal of amplifier 31, is applied to the inverting input terminal of operational amplifier 32 via a series interconnection of a capacitor $C_2$ and a resistor $R_3$. A series interconnection of a capacitor $C_1$ and a resistor $R_2$ is connected between the output terminal and the inverting input terminal of operational amplifier 31. Furthermore, a network $Z_4$ is connected between the output terminal and the inverting input terminal of operational amplifier 32. Finally, the output terminal of amplifier 32 is connected to output terminal 27 of stage 18. To synthesize the impedance function of equation (3), network $Z_4$ must be characterized by an impedance function having the expression $$Z_4(s) = K_b(sA+1)/(sB+1) \qquad (5)$$

where $K_b$ is a constant having a particular value as derived below. Network $Z_4$ may, in its simplest form, comprise a resistor connected in series to a parallel combination of a resistor and a capacitor. From a perusal of FIG. 3, it can be seen that $$e_{in}/R_1 = -e_2 sC_1/(sC_1R_2+1), \qquad (6)$$

that $$e_2 sC_2/(sC_2R_3+1) = -e_o(sB+1)/K_b(sA+1), \qquad (7)$$

and that, therefore $$T(s) = e_o/e_{in} = K_bC_2(sA+1)(sC_1R_2+1)/R_1C_1(sC_2R_3+1)(sB+1). \qquad (8)$$

The fact that this circuit meets the requirements of equation (4) may be appreciated by comparing the right-hand portion of equation (4) with the right-hand portion of equation (8). When this is done, the term $C_1R_2$ may be set equal to $P_1$, the term $C_2R_3$ may be set equal to $Z_1$, the term $A$ may be set equal to $P_2$, the term $B$ may be set equal to $Z_2$, and the term $K_bC_2/R_1C_1$ may be set equal to the term $R_{29}/K_a$. The adjustability of the DC scale factor $K_a$ as required by equation (3) may be accomplished by controlling the value of either resistor $R_1$, or resistor $R_{29}$, and the adjustability of $P_1$ as required by equation (3) may be accomplished by controlling the value of resistor $R_2$. Accordingly, in FIG. 3, resistors $R_1$ and $R_2$ are shown as being adjustable resistors, respectively responsive to a gain control signal on terminal 13 and to a pole control signal on terminal 14.

4. Example of Sense Circuit 120

Sense circuit 120 of FIG. 1 provides a measure of the inequality of signals on ports 1 and 3 of the hybrid network 100 of FIG. 1 and develops proper control signals to be applied to balancing network 110 during the automatic balancing and thereafter. As previously disclosed, the measure of inequality is indicated by the inequality in magnitude and in phase of the two measured signals. Accordingly, sense circuit 120 comprises two sections; a section which measures the magnitude inequality, and a section which measures the phase inequality.

Figure 4:
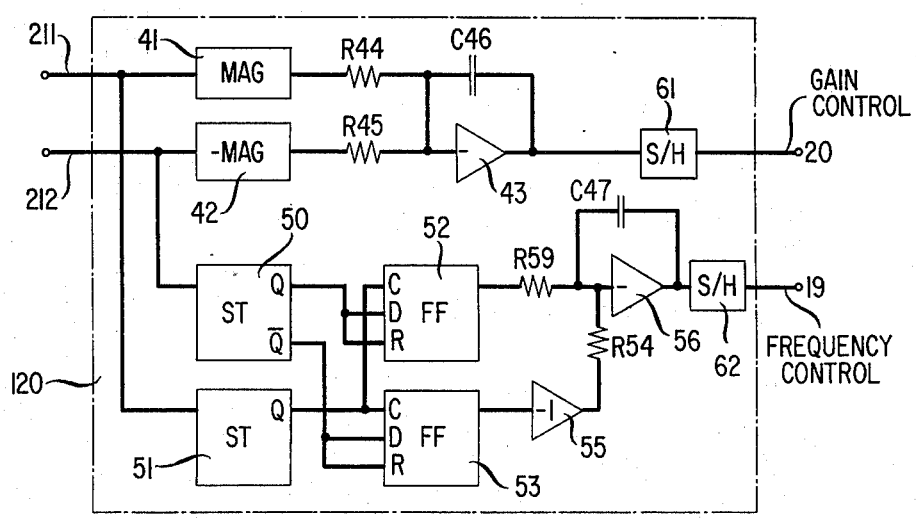
FIG. 4 depicts the block diagram of one embodiment of sense circuit 120 of FIG. 1.

FIG. 4 depicts one embodiment for sense circuit 120 with active elements 41, 42, and 43 comprising the magnitude measuring section, and active elements 50, 51, 52, 53, 55 and 56 comprising the phase measuring section.

In the magnitude measuring section, the signal appearing on port 1 of hybrid 100 in FIG. 1 is connected, via line 211, to a positive magnitude circuit 41, and the signal appearing on port 3 of hybrid 100 in FIG. 1, is connected, via line 212, to a negative magnitude circuit 42. Magnitude circuits 41 and 42 may be passive circuits, such as full wave diode bridge rectifiers, or may be active magnitude circuits, as described, for example, in an article entitled "A Simple Absolute-Value Amplifier," published in the June 20, 1974 issue of EDN, p. 78. In the above article, FIG. 2 depicts a unity gain positive magnitude circuit. A negative magnitude circuit may be obtained by simply reversing the polarity of the diodes shown in the circuit.

The output signals of circuits 41, and 42 in FIG. 4 are connected via resistors $R_{44}$ and $R_{45}$, respectively, to the input terminal of inverting amplifier 43. A cappacitor $C_{46}$ is connected between the output and the input terminals of amplifier 43, and the output terminal of operational amplifier 43 is connected to a sample-and-hold circuit 61. The output signal of circuit 61 is connected to a gain control output terminal 20 of circuit 120, and terminal 20 of circuit 120 is connected to terminal 13 of balancing network 110.

Sample-and-hold (S/H) circuit 61 either transfers its input signal to its output terminal or maintains at its output terminal the last transferred signal. During the automatic balancing of the hybrid networks, S/H circuit 61 continually transfers its input signal to output terminal 20 of circuit 120. When proper hybrid balance is achieved, circuit 61 is made to maintain its last transferred signal. This allows for the disconnection of the test signal and for the commencement of normal operation. Sample-and-hold circuit 61 may be an analog circuit or a digital circuit. A digital S/H circuit may be implemented with an A/D converter responsive to the input signal to be sampled, a digital storage register responsive to the A/D converter's output signal and to the sampling control signal, and a D/A converter responsive to the digital storage register's output signal.

In the phase measuring section, line 212 is connected to a Schmitt trigger circuit 50, and line 211 is connected to a Schmitt trigger circuit 51. Schmitt triggers 50 and 51 square up the waveform of the input signal so that all amplitude information is lost and only phase information is retained (through retention of the zero crossings information). The noninverted output signal (Q) of trigger 50 is connected to the D and the Clear (R) inputs of a D flip-flop 52, and the inverted output signal (Q) of trigger 50 is connected to the D and the Clear (R) inputs of a D flip-flop 53. The output signal of trigger 51 is connected to the Clock (C) inputs of flip-flops 52 and 53. Flip-flops 52 and 53 transfer their input signal to their output upon the occurrence of an up transition of the signal applied to their Clock inputs, and flip-flops 52 and 53 clear their output to zero upon the occurrence of a low level on their Clear input. Flip-flops 52 and 53 may be Texas Instruments Inc. SN7474 flip-flops.

When the input signal of trigger 50 leads (in time) the input signal of trigger 51, flip-flop 52 develops an output signal having pulses whose widths are dependent on that time lead between trigger 50 and trigger 51 input signals. When flip-flop 52 develops an output signal, no output signal is developed by flip-flop 53. When trigger 50 input signal lags trigger 51 input signal, flip-flop 52 produces no output signal while flip-flop 53 produces an output signal having pulses whose widths are dependent on the time lag between trigger 50 and trigger 51 input signals. The output signal of flip-flop 53 is negated in inverting amplifier 55, and the output signals of amplifier 55 and of flip-flop 52 are respectively connected to the input terminal of inverting operational amplifier 56 via resistors $R_{54}$ and $R_{59}$. The output terminal of amplifier 56 is connected to its input terminal via a capacitor $C_{47}$ and to a sample-and-hold circuit 62. The output signal of S/H circuit 62 is connected to an output terminal 19 of the sense circuit 120. The output signal on terminal 19 comprises the frequency control signal of the hybrid balancing network 110. In operation and in construction, S/H circuit 62 is identical to S/H circuit 61.

In accordance with the principles of this invention, in a nonloaded cable installation it is necessary to provide a pole control signal. Accordingly, in a nonloaded cable installation, frequency control terminal 19 is connected to the pole control terminal 14 of the voltage transfer ratio stage 18 of hybrid balancing network 110.

5. Hybrid Balancing for Loaded Cables

Loaded cable installations are characterized by loading coils placed at substantially equal intervals along the length of the transmission line. As is known in the art, loaded cable facilities are often used in long transmission lines because loading coils decrease cable losses within the frequency range of 500 Hz to 4,000 Hz. A balancing network which simulates the impedance of loaded cables can be realized by an embodiment of the present invention. Further, it has been found that an embodiment of this invention can balance a loaded transmission line of various gauge constructions, including, for example, 19, 22, 24, and 26 gauge cables varying in length from 18,000 feet to 114,000 feet. Still further, when a loaded cable contains a full near-end section of 6,000 feet, or when a full near-end section is simulated with a built-out capacitor network placed in parallel with the cable, a driving point impedance of the form:

$$Z(s) = K_c(sZ_1+1)(s^2+Es+F)/(sP_1+1)(s^2+Cs+D) \qquad (9)$$

can balance substantially all of the above-described loaded cable installations, where $K_c$ is an adjustable gain factor, $(sZ_1+1)$ contributes an adjustable real zero, $(s^2+Es+F)$ contributes a fixed pair of complex conjugate zeros, $(sP_1+1)$ contributes a fixed pole, and $(s^2+Cs+D)$ contributes a fixed pair of complex conjugate poles. From a close scrutiny of equation (9), it can be realized that the network 18 configuration depicted in FIG. 3 can advantageously be utilized in combination with the circuit of FIG. 2 to synthesize the impedance function expressed by equation (9). More specifically, network $Z_4$ in FIG. 3 can be chosen to provide the pair of complex poles and the pair of complex zeros (which, in its simplest form, may comprise a resistor connected in series to a parallel combination of a capacitor and a series combination of a resistor and an inductor), and the required adjustability in the zero $1/Z_1$ can be implemented by making resistor $R_3$ in the circuit of FIG. 3 an adjustable resistor. Accordingly, resistor $R_3$ in FIG. 3 is depicted as being adjustable and responsive to a zero control signal applied to terminal 15 of hybrid balancing network 110. This control signal is obtained, in a loaded cable installation, by connecting the frequency control terminal 19 of sense circuit 120 to the zero control terminal 15 of hybrid balancing network 110.

What is claimed is:

1. Apparatus for automatically balancing a four signal port hybrid network having bidirectional signals at a fixed preselected one of said signal ports, comprising:
   a balancing impedance network connected to a second preselected one of said signal ports of said hybrid network, and exhibiting a prechosen impedance having a preselected number greater than one of variable impedance parameters; and
   a sense circuit responsive to signals present on said first and second preselected signal ports of said hybrid network for developing impedance control signals equal in number to said preselected number to control said impedance parameters, respectively.

2. Apparatus for automatically balancing a four port hybrid network to which is connected a bidirectional cable at a first preselected one of said signal ports, comprising:
   a balancing network having an input port connected to a second preselected one of said signal ports of said hybrid network and exhibiting at said input port an impedance having a prechosen number greater than one of variable impedance parameters; and
   a sense circuit responsive to said first port and said second port output signals for developing impedance control signals equal in number to said preselected number to control said impedance parameters, respectively.

3. The apparatus defined in claim 2 wherein said impedance control signals developed by said sense circuit comprise a gain control signal and a frequency control signal.

4. The apparatus defined in claim 3 wherein said gain control signal is representative of the difference in magnitude between the signals at said first port of said hybrid network and said second port of said hybrid network; and
   wherein said frequency control signal is representative of the phase difference between the signals at said first port of said hybrid network and said second port of said hybrid network.

5. Apparatus for automatically balancing a hybrid network, which hybrid is adapted for connection to a nonloaded bidirectional cable at a first preselected signal port, comprising:
   a balancing network connected to a second preselected signal port of said hybrid network exhibiting an impedance characterized by a scaler multiplier, one adjustable and one fixed real pole in the frequency domain, and two fixed real zeros in the frequency domain; and
   a sense circuit responsive to said first port and said second port output signals for developing a gain control signal to affect the adjustable scaler multiplier and a frequency control signal to affect the adjustable real pole in the frequency domain.

6. Apparatus for automatically balancing a hybrid network, comprising:
   a balancing network connected to a first preselected signal port of said hybrid network exhibiting an impedance characterized by an adjustable scaler multiplier, an adjustable real zero in the frequency domain, a pair of complex conjugate zeros in the frequency domain, a fixed real pole in the frequency domain, and a pair of complex conjugate poles in the frequency domain; and
   a sense circuit responsive to the signals present on a second signal port when a loaded bidirectional cable is connected thereto, and the signals present at said first signal port, for developing a gain control signal to affect the adjustable scaler multiplier, and a frequency control signal to affect the adjustable zero in the frequency domain.

7. An automatic impedance balancing circuit for use with a telephone hybrid network having a first signal port adapted for connection to a nonloaded bidirectional cable, said circuit comprising: a first operational amplifier connected to a second preselected signal port of said hybrid network;
   a voltage transfer ratio stage connected to the output of said first operational amplifier characterized by a voltage transfer ratio having a scaler multiplier, two poles in the frequency domain and two zeroes in the frequency domain and having a first control terminal for affecting the value of said scaler multiplier and a second control terminal for affecting the frequency of one of said poles;
   a second operational amplifier whose one input is connected to the output terminal of said voltage transfer ratio stage and whose other input is connected to the output of said first operational amplifier;
   a first resistor having one of its leads connected to the output terminal of said second amplifier and the other one of its leads connected to said second preselected signal port of said hybrid network;
   first means responsive to the output signals of said first and second preselected ports of said hybrid network for developing a gain control signal and for applying said gain control signal to said first control terminals; and second means responsive to the output signals of said first and second preselected ports of said hybrid network for developing a frequency control signal indicative of the phase difference between the signal at said first preselected port of said hybrid network and the signal at said second preselected port of said hybrid network and for applying said frequency control signal to said second control terminal.

8. An automatic impedance balancing circuit for use with a telephone hybrid network connected to a loaded bidirectional cable at a first preselected signal port of said hybrid network, said circuit comprising:
- a first operational amplifier connected to a second preselected signal port of said hybrid network;
- a voltage transfer ratio stage connected to the output of said first operational amplifier characterized by a voltage transfer ratio having a scaler multiplier, a real pole and a pair of complex conjugate poles in the frequency domain, a real zero and a pair of complex conjugate zeros in the frequency domain and having a first control terminal for affecting the value of said scaler multiplier, and a second control terminal for affecting the frequency of one of said zeros;
- a second operational amplifier whose one input is connected to the output terminal of said voltage transfer ratio stage and whose other input is connected to the output of said first operational amplifier;
- a first resistor having one of its leads connected to the other terminal of said second amplifier and the other one of its leads connected to said second preselected signal port of said hybrid network;
- first means responsive to the output signals of said first and second preselected ports of said hybrid network for developing a gain control signal and for applying said gain control signal to said first control terminal; and second means responsive to the output signals of said first and second preselected ports of said hybrid network for developing a frequency control signal indicative of the phase difference between the signal at said first preselected port of said hybrid network and the signal at said second preselected port of said hybrid network and for applying said frequency control signal to said second control terminal.

9. Apparatus for automatically balancing a four signal port hybrid network comprising:
- a balancing impedance network for connection to a preselected one of the signal ports of a hybrid network which exhibits a prechosen impedance having a preselected number greater than one of variable impedance parameters; and
- a sense circuit responsive to signals supplied to a first signal port supplied with bidirectional signals, and said preselected signal port of said hybrid network for developing impedance control signals equal in number to said preselected number to control said impedance parameters, respectively.

10. Apparatus for automatically balancing a four port hybrid network to which is connected a bidirectional cable at a first preselected one of said signal ports, comprising:
- a balancing network having an input port connected to a second preselected one of said signal ports of said hybrid network and exhibiting at said input port an impedance having a prechosen number greater than one of variable impedance parameters; and
- a sense circuit responsive to said first port and said second port output signals for developing impedance control signals equal in number to said preselected number to control said impedance parameters, respectively.

* * * * *

UNITED STATES PATENT AND TRADEMARK OFFICE
CERTIFICATE OF CORRECTION

PATENT NO. : 3,982,080
DATED : September 21, 1976
INVENTOR(S) : Richard L. Ukeiley It is certified that error appears in the above-identified patent and that said Letters Patent are hereby corrected as shown below:

Column 1, line 35, "would" should read --could. Column 3, line 15, "current" should read --circuit. Column 4, line 26, that portion of the formula reading "$(sp_1+1)$" should read --$(sP_1+1)$--. Column 5, line 50, "cappacitor" should read --capacitor--. Column 6, line 15, "(Q)" should read --($\bar{Q}$)--.

Signed and Sealed this

Twenty-first Day of December 1976

[SEAL]

Attest:

RUTH C. MASON
*Attesting Officer*

C. MARSHALL DANN
*Commissioner of Patents and Trademarks*